(12) United States Patent
Kim et al.

(10) Patent No.: US 11,269,771 B2
(45) Date of Patent: Mar. 8, 2022

(54) STORAGE DEVICE FOR IMPROVING JOURNAL REPLAY, OPERATING METHOD THEREOF, AND ELECTRONIC DEVICE INCLUDING THE STORAGE DEVICE

(71) Applicant: SAMSUNG ELECTRONICS CO., LTD., Suwon-si (KR)

(72) Inventors: Junghoon Kim, Yongin-si (KR); Seonghun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 16/818,418

(22) Filed: Mar. 13, 2020

(65) Prior Publication Data

US 2021/0026763 A1 Jan. 28, 2021

(30) Foreign Application Priority Data

Jul. 23, 2019 (KR) .................. 10-2019-0088963

(51) Int. Cl.
*G06F 12/02* (2006.01)
*G06F 12/1009* (2016.01)
*G06F 12/0804* (2016.01)

(52) U.S. Cl.
CPC ...... *G06F 12/0292* (2013.01); *G06F 12/0246* (2013.01); *G06F 12/0804* (2013.01); *G06F 12/1009* (2013.01); *G06F 2212/1032* (2013.01); *G06F 2212/608* (2013.01)

(58) Field of Classification Search
CPC ............. G06F 12/0292; G06F 12/0246; G06F 12/0804; G06F 12/1009; G06F 2212/1032; G06F 2212/608
See application file for complete search history.

(56) References Cited

U.S. PATENT DOCUMENTS

| 8,880,786 B2 | 11/2014 | Guy et al. |
| 9,075,733 B1 * | 7/2015 | Feldman ............. G06F 12/0292 |
| 9,213,633 B2 | 12/2015 | Canepa et al. |
| 9,927,985 B2 | 3/2018 | Zhang et al. |
| 9,946,489 B2 | 4/2018 | Dreyer et al. |
| 10,402,283 B1 * | 9/2019 | Chen .................. G06F 11/1438 |
| 2009/0037648 A1 | 2/2009 | Park et al. |
| 2009/0193193 A1 * | 7/2009 | Kern .................. G06F 11/1441 711/128 |

(Continued)

FOREIGN PATENT DOCUMENTS

| KR | 10-1447188 | 10/2014 |
| KR | 10-2015-0018682 | 2/2015 |

(Continued)

*Primary Examiner* — Prasith Thammavong
(74) *Attorney, Agent, or Firm* — F. Chau & Associates, LLC

(57) ABSTRACT

A storage device includes a nonvolatile memory including a main meta data area and a journal area, and a controller. The controller updates an address mapping table including a plurality of page mapping entries divided into a plurality of segments by executing a flash translation layer (FTL) stored in a working memory, stores updated page mapping entries of the plurality of page mapping entries in the journal area as journal data, and stores the plurality of segments, each having a size smaller than a physical page of the nonvolatile memory, in the main meta data area.

17 Claims, 14 Drawing Sheets

(56) References Cited

U.S. PATENT DOCUMENTS

| | | | |
|---|---|---|---|
| 2011/0191522 A1* | 8/2011 | Condict | G06F 12/123 |
| | | | 711/103 |
| 2014/0337562 A1* | 11/2014 | Long | G06F 12/0804 |
| | | | 711/103 |
| 2015/0046670 A1 | 2/2015 | Kim et al. | |
| 2016/0117099 A1* | 4/2016 | Prins | G06F 3/061 |
| | | | 711/103 |
| 2016/0154594 A1* | 6/2016 | Kang | G06F 3/0688 |
| | | | 711/103 |
| 2016/0246530 A1 | 8/2016 | Mylavarapu | |
| 2016/0278067 A1* | 9/2016 | Badam | G06F 1/3275 |
| 2016/0364399 A1 | 12/2016 | Konik et al. | |
| 2017/0212690 A1* | 7/2017 | Babu | G06F 3/0608 |
| 2018/0095680 A1 | 4/2018 | Peterson et al. | |
| 2018/0144806 A1 | 5/2018 | Song | |
| 2018/0357154 A1 | 12/2018 | Lee et al. | |
| 2020/0081842 A1* | 3/2020 | Brown | G06F 11/14 |
| 2020/0089618 A1 | 3/2020 | Kim et al. | |
| 2020/0241970 A1* | 7/2020 | Shang | G06F 11/1458 |

FOREIGN PATENT DOCUMENTS

| | | |
|---|---|---|
| KR | 10-2018-0058328 | 6/2018 |
| KR | 10-2018-0134573 | 12/2018 |
| KR | 10-2020-0031924 | 3/2020 |

\* cited by examiner

FIG. 7

| MMA1 | | | | | |
|---|---|---|---|---|---|
| NVM Page | | | | | |
| SG111 | SG112 | ... | SG11y | TS11 | |
| SG121 | SG122 | ... | SG12y | TS12 | |
| SG131 | SG132 | ... | SG13y | TS13 | |
| SG141 | SG142 | ... | SG14y | TS14 | |
| SG151 | SG152 | ... | SG15y | TS15 | |
| ... | ... | ... | ... | ... | |
| SG1x1 | SG1x2 | ... | SG1xy | TS1x | |

| MMA2 | | | | | |
|---|---|---|---|---|---|
| NVM Page | | | | | |
| SG211 | SG212 | ... | SG21y | TS21 | |
| SG221 | SG222 | ... | SG22y | TS22 | |
| SG231 | SG232 | ... | SG23y | TS23 | |
| SG241 | SG242 | ... | SG24y | TS24 | |
| SG251 | SG252 | ... | SG25y | TS25 | |
| ... | ... | ... | ... | ... | |
| SG2x1 | SG2x2 | ... | SG2xy | TS2x | |

| JA1 | | | | | | | |
|---|---|---|---|---|---|---|---|
| NVM Page | | | | | | | |
| JE111 | JE112 | JE113 | JE114 | ... | JE11n | TS31 | |
| ... | ... | ... | ... | ... | ... | ... | |
| JE1m1 | JE1m2 | JE1m3 | JE1m4 | ... | JE1mn | TS3m | |

| JA2 | | | | | | | |
|---|---|---|---|---|---|---|---|
| NVM Page | | | | | | | |
| JE211 | JE212 | JE213 | JE214 | ... | JE21n | TS41 | |
| ... | ... | ... | ... | ... | ... | ... | |
| JE2m1 | JE2m2 | JE2m3 | JE2m4 | ... | JE2mn | TS4m | |

STORAGE DEVICE FOR IMPROVING JOURNAL REPLAY, OPERATING METHOD THEREOF, AND ELECTRONIC DEVICE INCLUDING THE STORAGE DEVICE

CROSS-REFERENCE TO RELATED APPLICATION

This application claims priority under 35 U.S.C. § 119 to Korean Patent Application No. 10-2019-0088963, filed on Jul. 23, 2019 in the Korean Intellectual Property Office, the disclosure of which is incorporated by reference herein in its entirety.

TECHNICAL FIELD

Exemplary embodiments of the inventive concept described herein relate to a storage device for improving a journal replay, an operating method thereof, and an electronic device including the storage device

DISCUSSION OF RELATED ART

A storage device that is a nonvolatile storage medium may retain data permanently or semipermanently regardless of whether a power is supplied thereto. The storage device may include both a nonvolatile memory and a volatile memory that is smaller in capacity than the nonvolatile memory but has a fast input/output speed. For example, the storage device may use the volatile memory as a cache memory with regard to the nonvolatile memory.

However, data stored in the volatile memory of the storage device may be lost when power events, such as sudden power off (SPO) and system crash, occur. Accordingly, to prevent the loss of data, the storage device may store data stored in the volatile memory in the nonvolatile memory.

SUMMARY

According to an exemplary embodiment of the inventive concept, a storage device includes a nonvolatile memory including a main meta data area and a journal area, and a controller. The controller updates an address mapping table including a plurality of page mapping entries divided into a plurality of segments by executing a flash translation layer (FTL) stored in a working memory, stores updated page mapping entries of the plurality of page mapping entries in the journal area as journal data, and stores the plurality of segments, each having a size smaller than a physical page of the nonvolatile memory, in the main meta data area.

According to an exemplary embodiment of the inventive concept, for an operating method of a storage device which includes a controller configured to execute a flash translation layer (FTL) and a nonvolatile memory including a main meta data area and a journal area, the operating method includes updating, by the controller, an address mapping table including a plurality of page mapping entries, storing updated page mapping entries of the plurality of page mapping entries in the journal area as journal data, and storing a plurality of segments in the main meta data area based on an order in which the updated page mapping entries are stored in the journal area and the number of the updated page mapping entries of each of the plurality of segments dividing the plurality of page mapping entries.

According to an exemplary embodiment of the inventive concept, an electronic device includes a host configured to transmit a request including a logical address, and a storage device including a nonvolatile memory and a controller. The nonvolatile memory includes a main meta data area and a journal area. The controller is further configured to update an address mapping table including a plurality of page mapping entries divided into a plurality of segments by processing the request of the host, store updated page mapping entries of the plurality of page mapping entries in the journal area as journal data, and store the plurality of segments, each having a size smaller than a physical page of the nonvolatile memory, in the main meta data area.

BRIEF DESCRIPTION OF THE FIGURES

The above and other objects and features of the inventive concept will become apparent by describing in detail exemplary embodiments thereof with reference to the accompanying drawings.

FIGS. 7 and 8 illustrate examples where a controller stores meta data together with timestamps according to exemplary embodiments of the inventive concept.

DETAILED DESCRIPTION OF THE EMBODIMENTS

Figure 1:
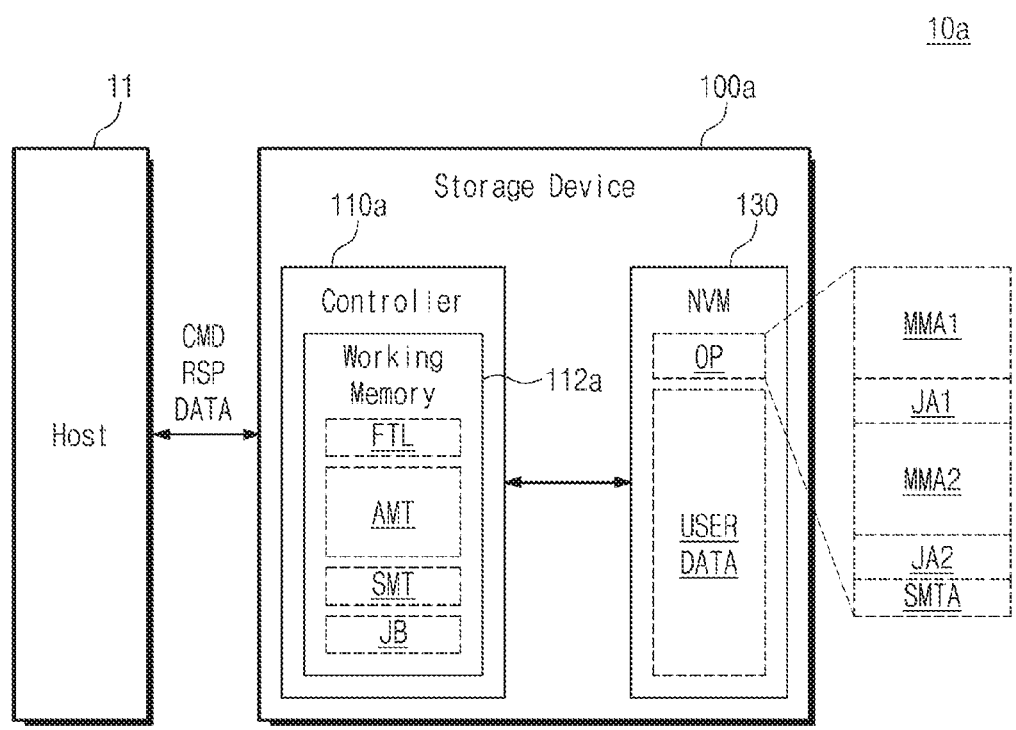
FIG. 1 illustrates a block diagram of an electronic device according to an exemplary embodiment of the inventive concept.

Exemplary embodiments of the inventive concept provide a storage device for improving a journal replay, an operating method thereof, and an electronic device including the storage device.

Exemplary embodiments of the inventive concept will be described more fully hereinafter with reference to the accompanying drawings. Like reference numerals may refer to like elements throughout this application.

FIG. 1 illustrates a block diagram of an electronic device according to an exemplary embodiment of the inventive concept. An electronic device 10a may be a personal computer, a workstation, a notebook, a tablet, a mobile device, or a smartphone, and may be referred to as a "computing system", an "electronic system", or a "mobile system". The electronic device 10a may include a host 11 and a storage device 100a.

The host 11 may transmit a command CMD to the storage device 100a. The host 11 may exchange data "DATA" with the storage device 100a. The host 11 may receive a response RSP to the command CMD from the storage device 100a. The host 11 may be implemented to include one or more processor cores. For example, the host 11 may include a general-purpose processor, a special-purpose processor, or an application processor. The host 11 may be a processor itself, or the host 11 may be an electronic device or a system including a processor.

The storage device 100a may communicate with the host 11 in compliance with various interface protocols. For example, the storage device 100a may be a solid state drive (SSD), an embedded memory card integrated in the electronic device 10a, a memory card removable from the electronic device 10a, a secure digital (SD) card, an embedded multimedia card (eMMC), a universal flash storage (UFS) card, etc. The storage device 100a may include a controller 110a and a nonvolatile memory 130. The controller 110a may write the data "DATA" in the nonvolatile memory 130 based on the command CMD of the host 11; alternatively, based on the command CMD of the host 11, the controller 110a may read the data "DATA" from the nonvolatile memory 130 and may transmit the read data "DATA" to the host 11. The controller 110a may process the command CMD, and may transmit the response RSP indicating a processing result to the host 11. The controller 110a may include a working memory 112a having a faster data input/output speed than the nonvolatile memory 130. The controller 110a may use the working memory 112a as a cache memory.

The controller 110a may execute a flash translation layer (FTL) stored in the working memory 112a. The FTL may be loaded onto the working memory 112a as firmware or a program stored in a ROM or the nonvolatile memory 130 of the storage device 100a. The FTL may be present between a file system (refer to FIG. 14) of the host 11 and the nonvolatile memory 130. The FTL may perform an address mapping operation to manage mapping between a logical address provided from the host 11 and a physical address of the nonvolatile memory 130. The FTL may further perform a garbage collection operation, a wear leveling operation, or the like, as well as the address mapping operation. The FTL may be executed by the controller 110a to address the following limitations of the nonvolatile memory 130: overwrite- or in-place write-impossible, a lifetime of a memory cell, a limited number of program/erase cycles, and an erase speed slower than a write speed. As the logical address is transmitted from the host 11 to the controller 110a together with the command CMD or a request, and the controller 110a processes the command CMD or the request, the FTL may update an address mapping table AMT including information about mapping between the logical address and the physical address. The address mapping table AMT may be stored in the working memory 112a.

The FTL may manage a segment mapping table SMT indicating a location of the nonvolatile memory 130, in which the mapping information of the address mapping table AMT is stored. The segment mapping table SMT may be stored in the working memory 112a, and a size of the segment mapping table SMT may be smaller than a size of the address mapping table AMT. As the controller 110a processes the request of the host 11, the FTL may update a portion (part) of the mapping information of the address mapping table AMT, and may store update information of the address mapping table AMT in a journal buffer JB. The journal buffer JB may be located at the working memory 112a.

The working memory 112a may include or store the FTL, the address mapping table AMT, the segment mapping table SMT, and the journal buffer JB. The working memory 112a may include an area for storing the FTL, an area for storing the address mapping table AMT, an area for storing the segment mapping table SMT, and an area that is allocated to the journal buffer JB, and the controller 110a may in advance set the above areas in the working memory 112a or may adjust the above areas according to a request of the host 11 or a user. For example, the working memory 112a may be a storage medium or an on-chip memory including a latch, a register, a static random access memory (SRAM), a dynamic random access memory (DRAM), a thyristor random access memory (TRAM), a tightly coupled memory (TCM), etc.

Under control of the controller 110a, the nonvolatile memory 130 may store (or write or program) data, or may provide data stored therein to the controller 110a. The nonvolatile memory 130 may include a user data area USER DATA and an over-provisioning area OP. The user data area USER DATA may be an area allocated to the host 11 and may store data based on a request of the host 11. The over-provisioning area OP may not be an area allocated to the host 11 and may not be open to the host 11. The controller 110a may use the over-provisioning area OP for managing the nonvolatile memory 130. For example, the over-provisioning area OP may be also referred to as a "meta data area".

For example, meta data stored in the working memory 112a may be lost when power events, such as sudden power off (SPO) or system crash (volatile), occur. The meta data may include the address mapping table AMT, the segment mapping table SMT, and update information (hereinafter referred to as "journal data") of the address mapping table AMT stored in the journal buffer JB. Additionally, the meta data may further include information about a read/write unit (e.g., a page) of the nonvolatile memory 130, information about an erase unit (e.g., a block BLK (refer to FIG. 14)) of the nonvolatile memory 130, etc. To prevent the above-described loss, the controller 110a may store the meta data stored in the working memory 112a in the over-provisioning area OP of the nonvolatile memory 130. The FTL may store the address mapping table AMT in main meta data areas MMA1 and MMA2, may store the segment mapping table SMT in a segment mapping table area SMTA, and may store journal data stored in the journal buffer JB in journal areas JA1 and JA2. The controller 110a may set in advance the above areas in the working memory 112a, or may adjust the above-described areas depending on a request of the host 11 or the user. The nonvolatile memory 130 may include nonvolatile memory cells such as a NAND flash memory cell, a NOR flash memory cell, a resistive random access memory (RRAM) cell, a ferroelectric random access memory (FRAM) cell, a phase change random access memory (PRAM) cell, or a magnetic random access memory (MRAM) cell.

Figure 2:
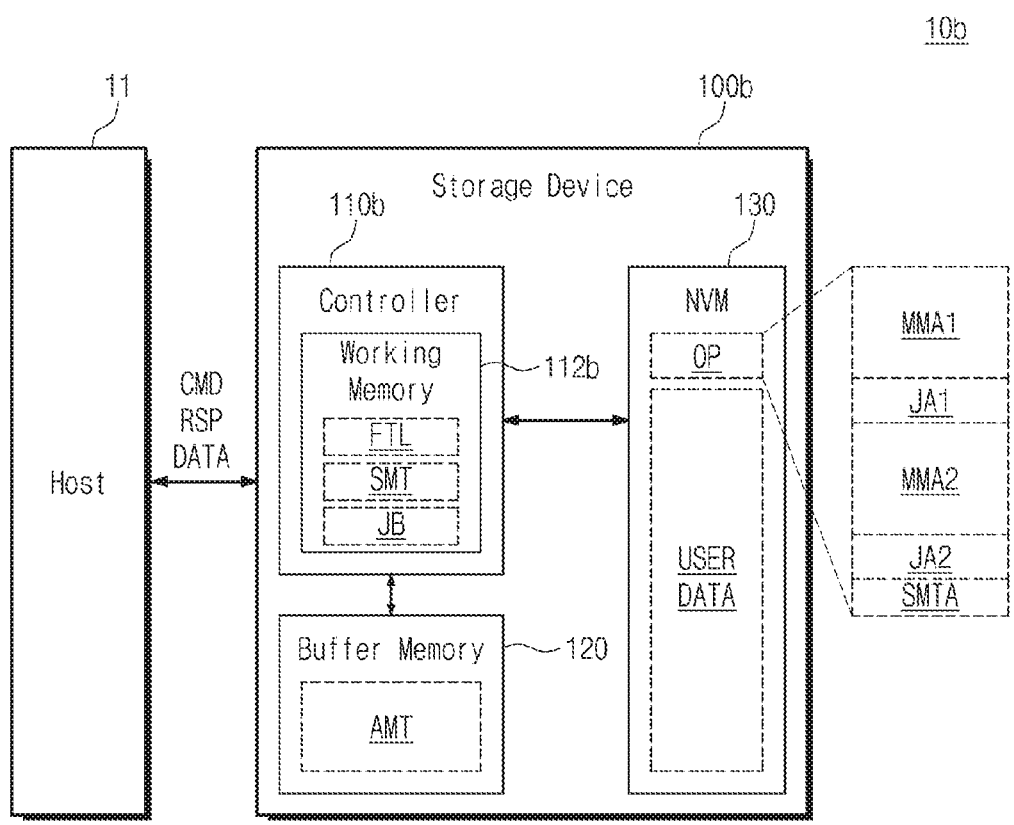
FIG. 2 illustrates a block diagram of an electronic device according to an exemplary embodiment of the inventive concept.

FIG. 2 illustrates a block diagram of an electronic device according to an exemplary embodiment of the inventive concept. An electronic device 10b may include the host 11 and a storage device 100b. The electronic device 10b may be substantially identical to the electronic device 10a except for the storage device 100b. The storage device 100b may include a controller 110b and the nonvolatile memory 130. Compared with the storage device 100a, the storage device 100b may further include a buffer memory 120. The controller 110b may include a working memory 112b that is substantially identical to the working memory 112a, and may further use the buffer memory 120 as a cache memory unlike the controller 110a. For example, the buffer memory 120 may be located outside the controller 110b.

The controller 110b may store and load the address mapping table AMT onto the buffer memory 120. Unlike the example illustrated in FIG. 1, the controller 110b may store and load the address mapping table AMT onto both the working memory 112b and the buffer memory 120. As a capacity of the nonvolatile memory 130 increases, a size of the address mapping table AMT may increase. In this case, the address mapping table AMT may be stored in the buffer memory 120 located outside the controller 110b. For example, the buffer memory 120 may be a storage medium including a latch, a register, an SRAM, a DRAM, a TRAM, a TCM, etc. The controller 110b may store and load the FTL, the segment mapping table SMT, and the journal buffer JB onto the working memory 112b. An operation of the storage device 100b may be similar to the operation of the storage device 100a, except that the storage device 100b further includes the buffer memory 120. Below, a storage device 100 may refer to one of the storage devices 100a and 100b, a controller 110 may refer to one of the controllers 110a and 110b, and a working memory 112 may refer to one of the working memories 112a and 112b.

The FTL that is executed by the controller 110 of the storage device 100 according to an exemplary embodiment of the inventive concept may reduce a time or cost to perform a journal replay for recovering the address mapping table AMT loaded onto the working memory 112 or the buffer memory 120 based on information read from the journal areas JA1 and JA2 of the nonvolatile memory 130.

FIGS. 3 to 6 illustrate diagrams for describing how a controller according to an exemplary embodiment of the inventive concept stores meta data in a nonvolatile memory. FIGS. 3 to 6 will be described together with reference to FIGS. 1 and 2.

Figure 3:
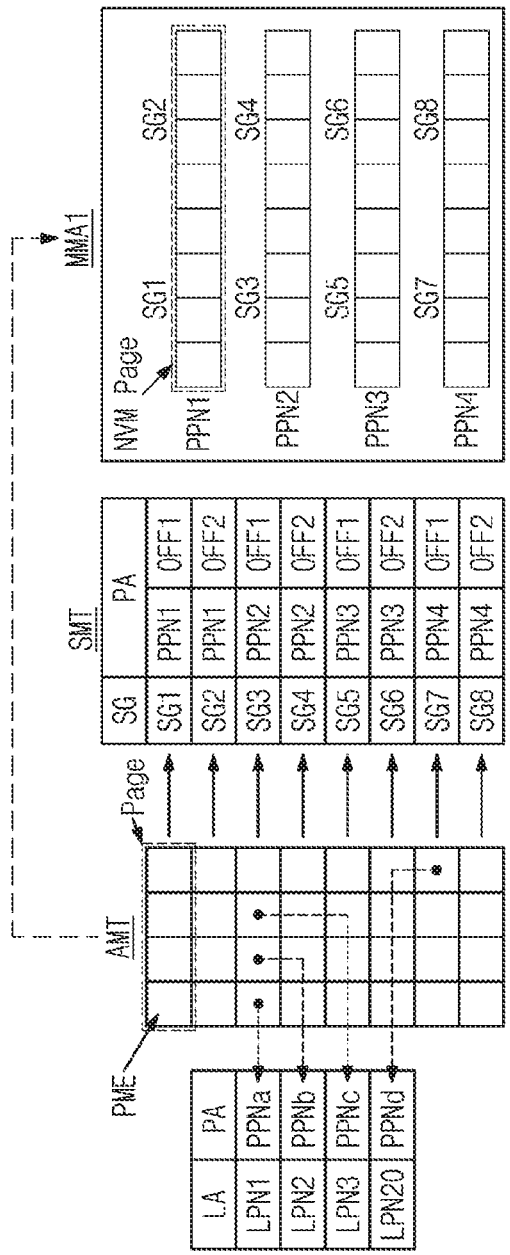
FIGS. 3 to 6 illustrate diagrams for describing how a controller according to an exemplary embodiment of the inventive concept stores meta data in a nonvolatile memory.

The address mapping table AMT may include page mapping entries PME. The page mapping entry PME may store a physical address PA corresponding to a logical address LA. A location of the page mapping entry PME on the address mapping table AMT may correspond to a logical page number LPN, and the page mapping entry PME may store a physical page number PPN corresponding to the logical address number LPN. Referring to FIG. 3, some page mapping entries PME of the address mapping table AMT may store physical page numbers PPNa to PPNd corresponding to logical page numbers LPN1 to LPN3 and LPN20, respectively. Here, the logical page numbers LPN1 to LPN3 and LPN20 and the physical page numbers PPNa to PPNd are only an example. The physical page numbers PPNa to PPNd may indicate some physical pages of blocks allocated to the user data area USER DATA of FIGS. 1 and 2. For example, the page mapping entries PME of the address mapping table AMT may be implemented in the form of an array and may be divided in units of pages. A page of the address mapping table AMT may correspond to a data input/output size of a file system executable on the host 11 and may be 4 KB, but the inventive concept is not limited to the above numerical values. The number of page mapping entries PME of the address mapping table AMT is not limited to the example illustrated in FIGS. 3 to 6.

The segment mapping table SMT may indicate locations (or physical addresses PA), at which segments SG are stored, of the main meta data area MMA1 of the nonvolatile memory 130. Segments SG1 to SG8 may include the page mapping entries PME of the address mapping table AMT. The page mapping entries PME of the address mapping table AMT may be divided into the segments SG1 to SG8. A size of a physical page (NVM Page) of the nonvolatile memory 130 may correspond to a write unit or a read unit of the nonvolatile memory 130, and a size of a segment SG may be smaller than the size of the physical page of the nonvolatile memory 130. In general, when data having the size of the physical page of the nonvolatile memory 130 are gathered, the data may be written in the nonvolatile memory 130. In the case where the segment mapping table SMT is not used, the controller 110 may write the physical mapping entries PME in the main meta data area MMA1 in units having the size of the physical page of the nonvolatile memory 130. For example, the controller 110 may vary or adjust the size of the segment SG.

In contrast, the controller 110 according to an exemplary embodiment of the inventive concept may logically divide one physical page of the nonvolatile memory 130, which fails to be physically divided to be smaller, into segments, may gather the page mapping entries PME in units having the size of the segment, and may write segments in the main meta data area MMA1 in units having the size of one physical page of the nonvolatile memory 130. Referring to FIG. 3, the segment mapping table SMT may include the segments SG1 to SG8, as well as physical page numbers PPN1 to PPN4 and offsets OFF1 and OFF2 indicating locations where the segments SG1 to SG8 are stored. The offset OFF1 may indicate a location of a certain area of a physical page, and the offset OFF2 may indicate a location of another area of the physical page. In the case where one physical page is divided into two or more segments, the number of offsets may increase depending on the number of segments.

For convenience of description and illustration, an example is illustrated where a page size of the address mapping table AMT is identical to a size of the segment SG, but the page size of the address mapping table AMT and the size of the segment SG may be different from each other. The number of page mapping entries PME allocated to the segment SG, the number of segments per physical page, and the number of physical pages included in the main meta data area MMA1 are not limited to the example illustrated in FIG. 3, and the main meta data area MMA1 may include one or more blocks.

In FIG. 3, it is assumed that page mapping entries of the address mapping table AMT stored in the working memory 112 or the buffer memory 120 are stored or written in the main meta data area MMA1 of the nonvolatile memory 130. In FIG. 3, the address mapping table AMT stored in the working memory 112 or the buffer memory 120 may coincide with (be the same as, be identical to, or match) the address mapping table AMT stored in the main meta data area MMA1 of the nonvolatile memory 130.

The controller 110 may execute the FTL, and the FTL may update the address mapping table AMT. For example, the FTL may update or change physical page numbers corresponding to the logical page numbers LPN1 to LPN3 and LPN20 from PPNa to PPNd of FIG. 3 to PPNe to PPNh of FIG. 4. The physical page numbers PPNe to PPNh may indicate some of the remaining physical pages of the physical pages of the blocks allocated to the user data area USER DATA. Page mapping entries updated by the FTL are marked by "U1" in FIG. 4. The number of updated page mapping entries and locations thereof are not limited to the example illustrated in FIG. 4. In this case, the address mapping table AMT stored in the working memory 112 or the buffer memory 120 may be different from the address mapping table AMT stored in the main meta data area MMA1 of the nonvolatile memory 130.

Instead of writing the whole of the address mapping table AMT (e.g., all the page mapping entries of the address mapping table AMT) in the nonvolatile memory 130 for data coherency, the FTL may store or gather updated page mapping entries U1 of all the page mapping entries of the address mapping table AMT in the journal buffer JB of the working memory 112, and may then store or write the updated page mapping entries U1 stored in the journal buffer JB in the journal area JA1 of the nonvolatile memory 130. For example, when the journal buffer JB is full as the updated page mapping entries U1 are stored in the journal buffer JB, the FTL may store the updated page mapping entries, stored in the journal buffer JB, in the journal area JA1 of the nonvolatile memory 130.

Figure 4:
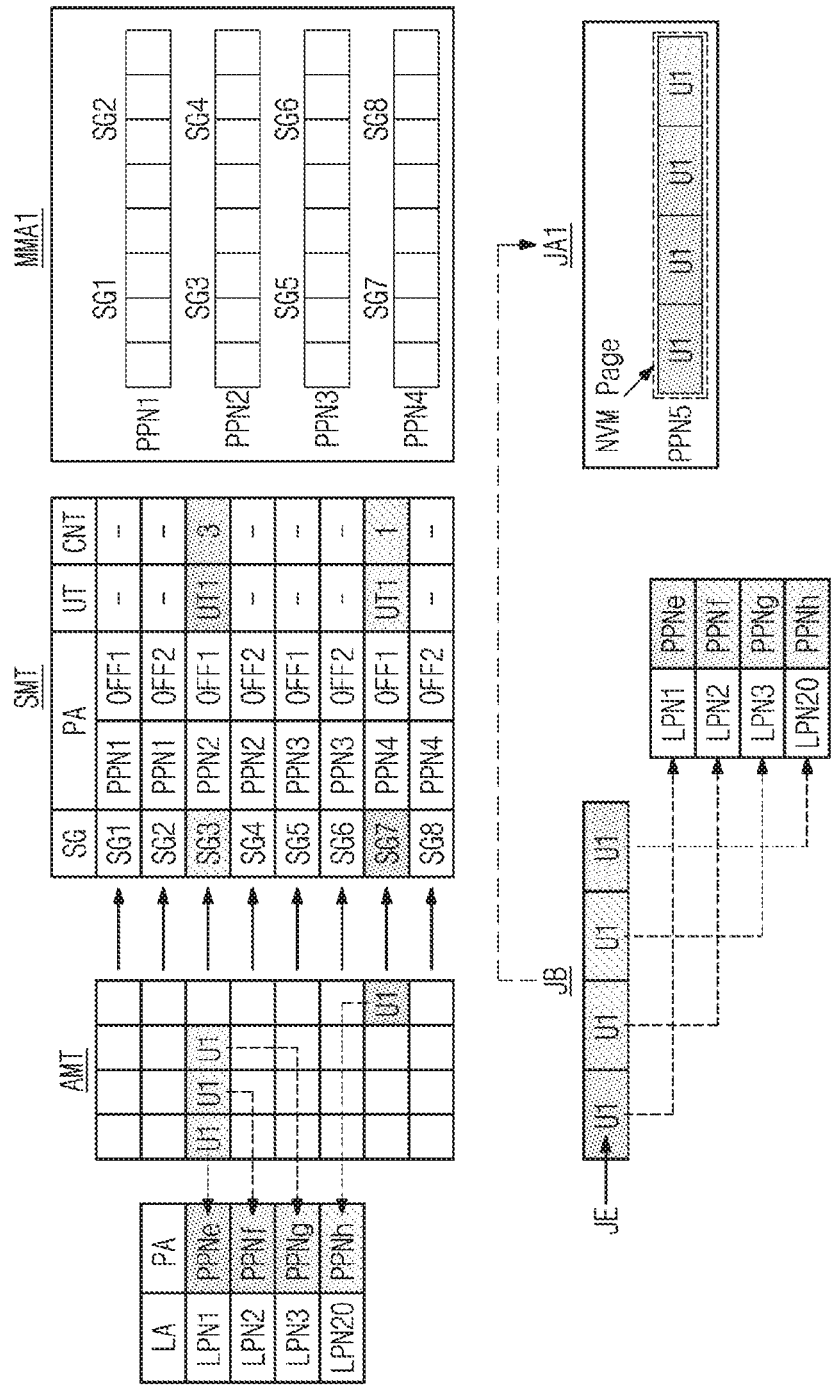

Referring to FIG. 4, the FTL may update the page mapping entries U1 and may store the logical page numbers LPN1 to LPN3 and LPN20 of the page mapping entries U1 and the updated physical page numbers PPNe to PPNh in the journal buffer JB. For example, each of the page mapping entries PME may store only a physical page number PPN corresponding to a logical page number LPN, and each of journal entries JE of the journal buffer JB may store both a physical page number PPN and a logical page number LPN. A size of each of the journal entries JE may be larger than the size of each of the page mapping entries PME. The size of the journal buffer JB may be identical to the size of the physical page of the nonvolatile memory 130 or may be smaller than the size of the physical page of the nonvolatile memory 130. The number of journal entries JE of the journal buffer JB is not limited to the example illustrated in FIG. 4, and the journal entries JE may correspond to journal data.

When updating the address mapping table AMT, the FTL may also update the segment mapping table SMT. The number of updated segments SG and locations thereof are not limited to the example illustrated in FIG. 4. The segment mapping table SMT may further include information about times UT when the segments SG are updated and information about the number (or a count CNT) of the updated page mapping entries U1 that each of the segments SG has.

An example is illustrated in FIG. 4 as three page mapping entries U1 of the segment SG3 are updated. The FTL may mark a time (hereinafter referred to as to an "update time") when the segment SG3 is updated as "UT1", and may mark the number CNT of updated page mapping entries U1 of the segment SG3 as "3", in the segment mapping table SMT. For example, update times of the updated page mapping entry U1 belonging to the segment SG3 may be identical or different, and the FTL may determine an update time of the segment SG3 based on the most recently updated page mapping entry. For example, the FTL may count the number of updated page mapping entries U1 of page mapping entries belonging to the segment SG3. As in the above description, the FTL may mark an update time of the segment SG7 as "UT1", and may mark the number CNT of updated page mapping entries U1 of the segment SG7 as "1".

As described above, the FTL may determine the update time UT of the segment SG based on the most recently updated page mapping entry. As another example, the FTL may determine the update time UT of the segment SG based on a time when the updated page mapping entries stored in the journal buffer JB are stored in the journal area JA1 or are transmitted to the journal area JA1. The update times UT1 of the segments SG3 and the SG7 in the segment mapping table SMT may be identical or different. In any case, the update times UT1 of the segments SG3 and the SG7 may indicate an order in which the segments SG3 and SG7 are updated or an order in which the updated page mapping entries U1 of the segments SG3 and the SG7 are stored in the journal area JA1.

Figure 5:
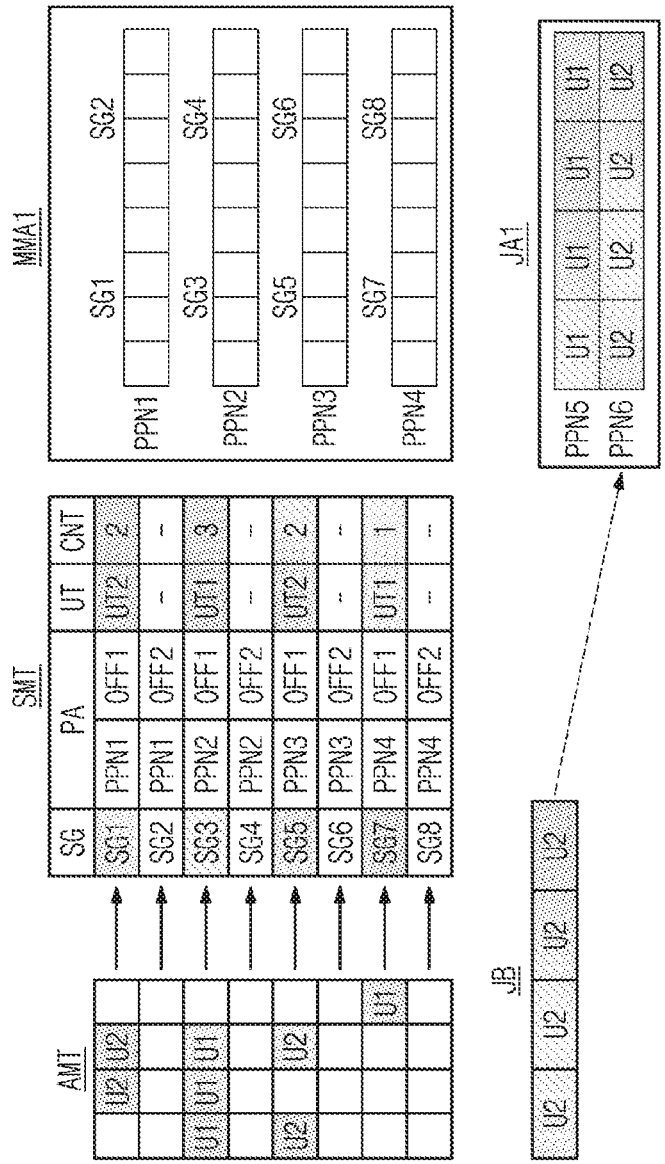

The FTL may update the page mapping entries U1 and then may also update other page mapping entries U2 of the address mapping table AMT. Referring to FIG. 5, page mapping entries U2 updated by the FTL are illustrated as an example. The FTL may store or overwrite the updated page mapping entries PME in the journal buffer JB. Afterward, the FTL may store or write the updated page mapping entries U2 stored in the journal buffer JB in the journal area JA1 of the nonvolatile memory 130. Referring to FIGS. 4 and 5, the FTL may store the updated page mapping entries U1 at a physical page PPN5 of the journal area JA1, and may store the updated page mapping entries U2 at a physical page PPN6 of the journal area JA1. The FTL may update the page mapping entries U1 and U2 of the address mapping table AMT, may store the updated page mapping entries U1 and U2 in the journal buffer JB, and may store the updated page mapping entries U1 and U2 of the journal buffer JB in the journal area JA1. The page mapping entries U1 and U2 updated by the controller 110 may be accumulated in the journal area JA1 through the journal buffer JB.

Referring to FIG. 5, the FTL may update the page mapping entries U2 and may also update the segment mapping table SMT. The FTL may mark a time when the segment SG1 is updated as "UT2", and may mark the number CNT of updated page mapping entries U2 of the segment SG1 as "2", in the segment mapping table SMT. As in the above description, the FTL may mark a time when the segment SG5 is updated as "UT2", and may mark the number CNT of updated page mapping entries U2 of the segment SG5 as "2", in the segment mapping table SMT. The FTL may identify (check) the update times UT1 and UT2 of the segment mapping table SMT, and may identify that the segments SG3 and SG7 are updated prior to the segments SG1 and SG5 and that updated segment mapping entries of the segments SG3 and SG7 are stored in the journal area JA1 before updated segment mapping entries of the segments SG1 and SG5. The FTL may identify the count CNT of the segment mapping table SMT and may identify that the segment SG3 has a greatest number of updated page mapping entries U1 and the segment SG7 has a smallest number of updated page mapping entries U1.

The number of physical pages allocated to the journal area JA1 is not limited to the example illustrated in FIG. 5, and the journal area JA1 may include one or more blocks. However, a size or capacity of the journal area JA1 allocated by the controller 110 may be restrictive, and the controller 110 may endlessly fail to store updated page mapping entries in the journal area JA1. For convenience of description and illustration, it is assumed that the journal area JA1 is full when the updated page mapping entries U2 are stored at the physical page PPN6 of the journal area JA1.

When the journal area JA1 is full, the FTL may store the address mapping table AMT in the main meta data area MMA2 of the nonvolatile memory 130. Physical pages PPN1 to PPN4 of the main meta data area MMA2 are different from physical pages PPN1 to PPN4 of the main meta data area MMA1, and the main meta data areas MMA1 and MMA2 are different areas. The page mapping entries PME of the address mapping table AMT may be divided into the segments SG1 to SG8. In FIGS. 3 to 6, to describe data coherency, the update of the address mapping table AMT, and a journaling technique, the segments SG1 and SG2, SG3 and SG4, SG5 and SG6, and SG7 and SG8 are illustrated as being sequentially stored at the physical pages PPN1, PPN2, PPN3, and PPN4, respectively, of the main meta data area MMA1. However, according to an exemplary embodiment of the inventive concept, the FTL may store the segments SG1 to SG8 in the nonvolatile memory 130 based on priorities.

The FTL may store the segments SG1 to SG8 in the main meta data area MMA2 with reference to the segment mapping table SMT. The FTL may identify the times UT1 and UT2 when the segments SG1 to SG8 are updated, and may store the segments SG1 to SG8 in the main meta data area MMA2 based on the order of updating the segments SG1 to SG8. For example, because the segments SG3 and SG7 are updated prior to the segments SG1 and SG5, the FTL may first store the segments SG3 and SG7 in the main meta data area MMA2 and may then store the segments SG1 and SG5 therein.

Additionally, the FTL may check the number CNT of updated page mapping entries U1 and U2 of each of the segments SG1 to SG8, and may store the segments SG1 to SG8 in the main meta data area MMA2 based on the number CNT of updated page mapping entries U1 and U2 of each of the segments SG1 to SG8. For example, because the number of updated page mapping entries of the segment SG3 is more than the number of updated page mapping entries of the segment SG7, the FTL may store the segment SG3 in the main meta data area MMA2 and may then store the segment SG7 therein. However, even though the number of updated page mapping entries of each of the segments SG1 and SG5 is more than the number of updated page mapping entries of the segment SG7, because the segment SG7 is updated prior to the segments SG1 and SG5, the FTL may first store the segment SG7 in the main meta data area MMA2. The FTL may determine priorities of storing the segments SG1 to SG8 in the main meta data area MMA2 first in consideration of the update times UT1 and UT2 of the segments SG1 to SG8, and then in consideration of the number CNT of updated page mapping entries U1 and U2 of each of the segments SG1 to SG8.

In an exemplary embodiment of the inventive concept, the FTL may determine a priority of storing meta data in the nonvolatile memory 130 based on a kind of meta data. As described above, a meta data kind may include the address mapping table AMT including information about page mapping between a logical address and a physical address, the segment mapping table SMT, and journal data, and may further include information about the nonvolatile memory 130 (e.g., information about a physical page being a read/write unit and information about a block being an erase unit). For example, the FTL may store the information about page mapping between a logical address and a physical address in the nonvolatile memory 130 prior to storing the information about the nonvolatile memory 130. The FTL may determine priorities of storing meta data in the nonvolatile memory 130 in consideration of the update times UT1 and UT2 of the segments SG1 to SG8, the number CNT of updated page mapping entries U1 and U2 of each of the segments SG1 to SG8, and a kind of meta data.

Figure 6:
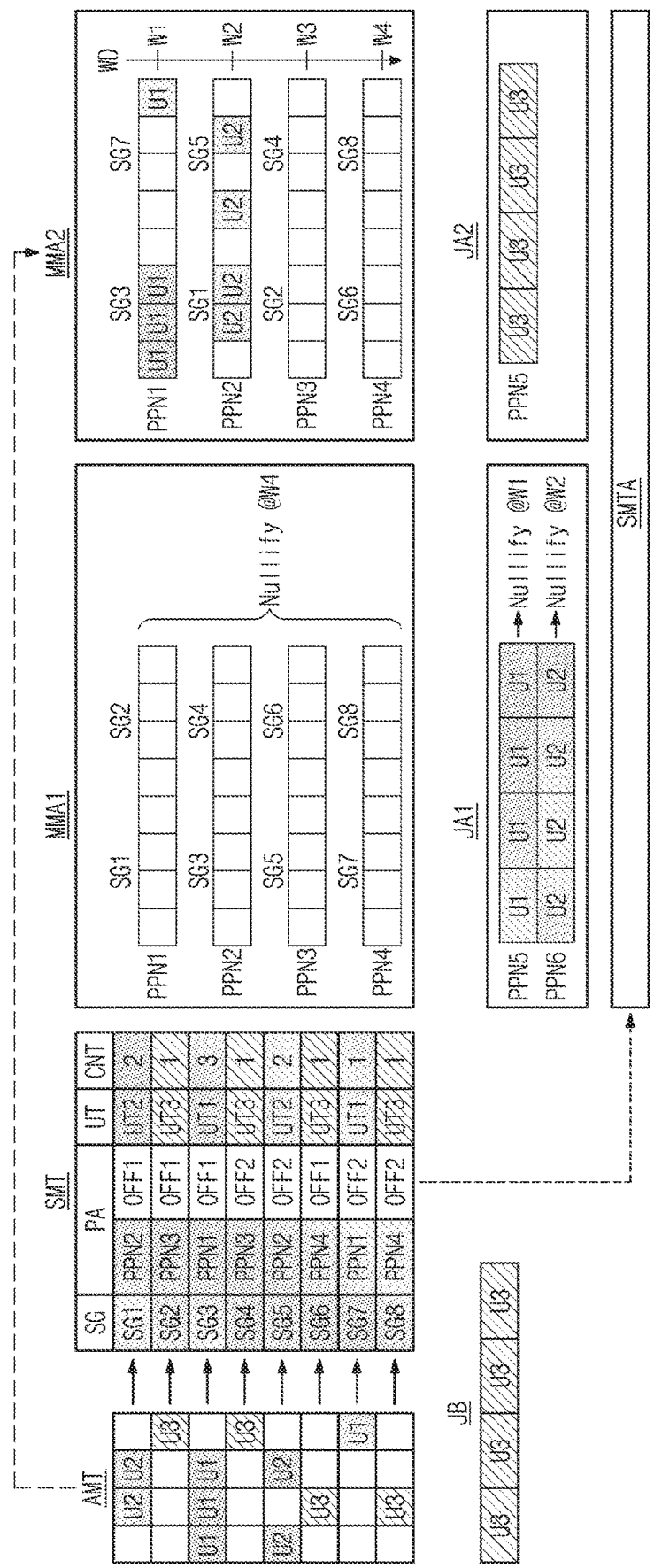

An example is illustrated in FIGS. 5 and 6 where the number of segments SG3 and SG7 updated at the same or similar times UT1 is 2 and the number of segments SG1 and SG5 updated at the same or similar times UT2 is 2. However, the number of segments updated at the same or similar times may be 2 or more. The FTL may determine priorities of storing segments updated at the same or similar times in the main meta data area MMA2 with reference to the number CNT of updated page mapping entries U1/U2 of each of segments updated at the same or similar times. The FTL may store a segment, in which the number of updated page mapping entries is relatively large, in the main meta data area MMA2 prior to a segment in which the number of updated page mapping entries is relatively small.

Based on the above priorities, the FTL may store the segments SG3 and SG7 updated at the time UT1 in the physical page PPN1 of the main meta data area MMA2, may store the segments SG1 and SG5 updated at the time UT2 in the physical page PPN2 of the main meta data area MMA2, and may store the remaining segments SG2, SG4, SG6, and SG8 not updated in the physical pages PPN3 and PPN4 of the main meta data area MMA2. The controller 110 may transmit data of one physical page unit to the nonvolatile memory 130, and the nonvolatile memory 130 may store or write the data transmitted from the controller 110 at a location (e.g., a physical page) requested by the controller 110. In FIG. 6, it is assumed that the controller 110 transmits data to be stored at one physical page to the nonvolatile memory 130, but the controller 110 may transmit data to be stored at one or more physical pages to the nonvolatile memory 130.

The segments SG3 and SG7 may be stored at the physical page PPN1 of the main meta data area MMA2 at a write time W1, the segments SG1 and SG5 may be stored at the physical page PPN2 of the main meta data area MMA2 at a write time W2 after the write time W1, the segments SG2 and SG4 may be stored at the physical page PPN3 of the main meta data area MMA2 at a write time W3 after the write time W2, and the segments SG6 and SG8 may be stored at the physical page PPN4 of the main meta data area MMA2 at a write time W4 after the write time W3. In the case where all the segments SG of the address mapping table AMT are stored in the main meta data area MMA2 at the write time W4, the address mapping table AMT stored in the main meta data area MMA2 may be the latest (newest) compared with the address mapping table AMT stored in the main meta data area MMA1. After the write time W4, the FTL may nullify the address mapping table AMT stored in the main meta data area MMA1, and may erase the address mapping table AMT stored in the main meta data area MMA1. The FTL may erase at least one block of the nonvolatile memory 130 allocated to the main meta data area MMA1.

As described above, the FTL may store the segments SG1 to SG8 in the main meta data area MMA2 based on priorities. The address mapping table AMT stored in the main meta data area MMA1 at the write time W4 may be nullified; in contrast, journal data associated with the updated page mapping entries U1 and U2 stored in the journal area JA1 may be nullified before the write time W4 because the segments SG1 to SG8 are stored in the main meta data area MMA2 based on priorities. When the segments SG3 and SG7 are stored in the main meta data area MMA2 at the write time W1, journal data associated with page mapping entries U1 stored at the physical page PPN5 of the journal area JA1 may be nullified at the write time W1. Similarly, when the segments SG1 and SG5 are stored in the main meta data area MMA2 at the write time W2, journal data associated with page mapping entries U2 stored at the physical page PPN6 of the journal area JA1 may be nullified at the write time W2. Based on priorities, the FTL may store segments having journal data stored in the journal area JA1 in the main meta data area MMA2 and may nullify the journal data stored in the journal area JA1 relatively early. For example, the FTL may erase the journal data stored in the journal area JA1 after the write time W2. The FTL may erase at least one block of the nonvolatile memory 130 allocated to the journal area JA1.

The FTL according to an exemplary embodiment of the inventive concept may store the segments SG1 to SG8 in the main meta data area MMA2 based on priorities. The FTL may store the segments SG in the main meta data area MMA2 in the order in which journal data is stored in the journal area JA1, and may store the segments SG in the main meta data area MMA2 in a descending order from the largest number of updated page mapping entries. According to an exemplary embodiment of the inventive concept, because journal data stored in the journal area JA1 are nullified relatively early, there may be a reduction in a time or cost to perform the journal replay, which is an operation where the FTL reads journal data stored in the journal area JA1 and updates the address mapping table AMT on the working memory 112 or the buffer memory 120 based on the journal data. For example, as the amount of journal data to be nullified increases, the amount of journal data that the FTL reads may decrease. Additionally, a write amplification factor (WAF) of the storage device 100 may be improved. Furthermore, there may be decrease in a time taken to initialize the storage device 100 after the storage device 100 is powered on or a power supply voltage is supplied to the storage device 100.

In an exemplary embodiment of the inventive concept, the FTL may store the segments SG1 to SG8 in the main meta data area MMA2 based on priorities, and may update the segment mapping table SMT so that the segment mapping table SMT has a location of the main meta data area MMA2, at which the segments SG1 to SG8 are stored. The segment mapping table SMT may include a location (e.g., PPN1 and OFF1) of the nonvolatile memory 130, where the segment SG3 is stored. As in the location of the segment SG3, locations of the remaining segments SG1, SG2, and SG4 to SG8 may be updated in the segment mapping table SMT. For example, the FTL may store the updated segment mapping table SMT in the segment mapping table area SMTA of the nonvolatile memory 130 after the write time W4.

The FTL may further update the address mapping table AMT on the working memory 112 or the buffer memory 120 after the write time W4 or while storing the address mapping table AMT in the main meta data area MMA2. Referring to FIG. 6, the FTL may update page mapping entries of the address mapping table AMT, which are marked with "U3". The FTL may store or overwrite the updated page mapping entries U3 in the journal buffer JB. The FTL may store or write the updated page mapping entries U3 stored in the journal buffer JB in the journal area JA2 of the nonvolatile memory 130. Referring to FIGS. 3 to 5, the above process is similar to the operation where journal data are stored and accumulated in the journal area JA1. Physical pages PPN5 and PPN6 of the journal area JA1 are different from a physical page PPN5 of the journal area JA2, and the journal areas JA1 and JA2 are different. When the journal area JA2 is full, the FTL may store the address mapping table AMT in a main meta data area different from the main meta data area MMA2. The different main meta data area may be the (erased) main meta data area MMA1 or may be a main meta data area, which is additionally allocated to store the address mapping table AMT, of the over-provisioning area OP of the nonvolatile memory 130. One main meta data area and one journal area may configure (constitute) one group, and an example where the number of groups is 2 is described with reference to FIGS. 3 to 6. However, the number of groups in the over-provisioning area OP may be 2 or more. As described with reference to FIGS. 3 to 6, the FTL may endlessly and repeatedly store the address mapping table AMT and journal data of the journal buffer JB in two or more groups.

Figure 8:
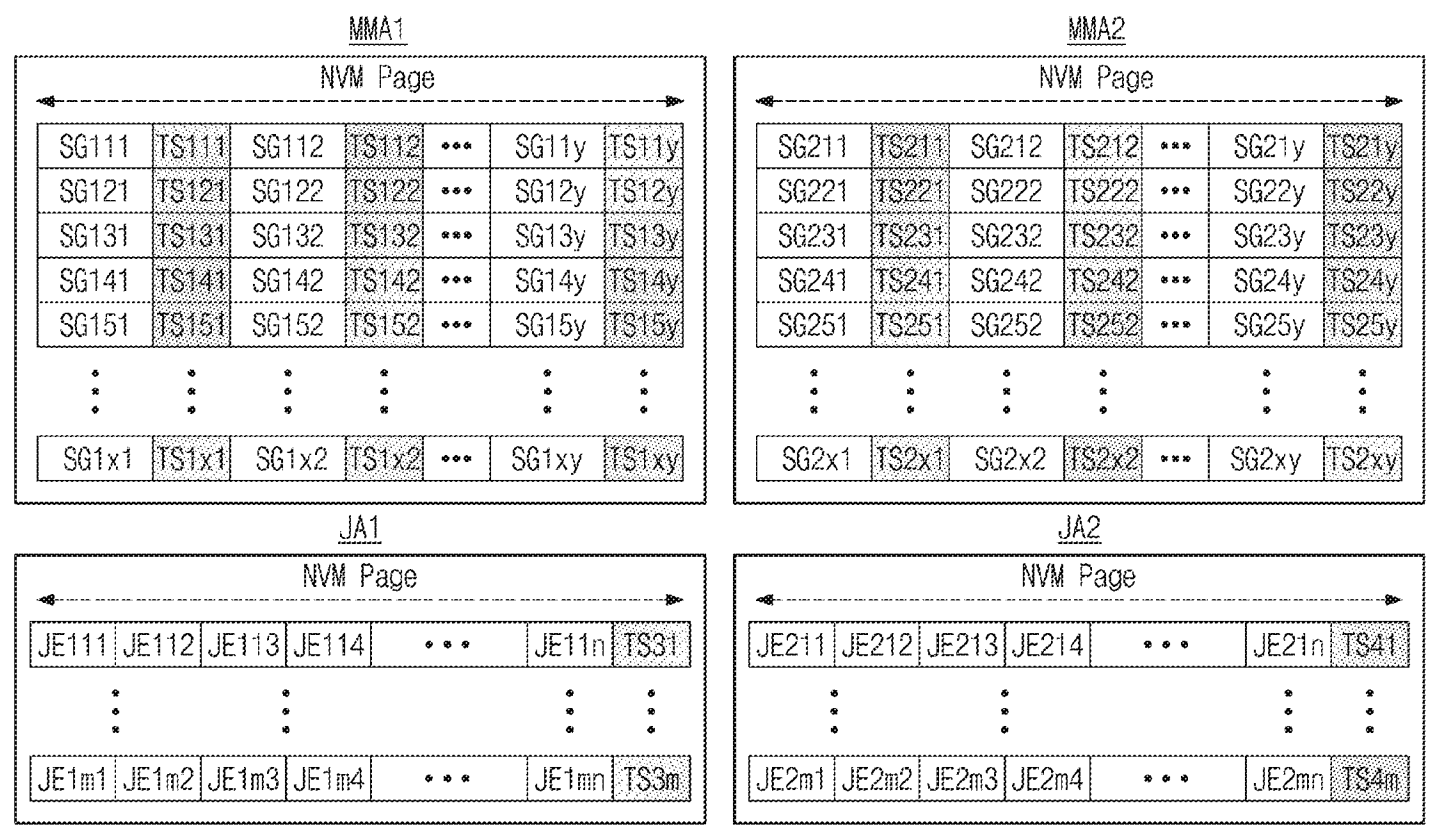

FIGS. 7 and 8 illustrate examples where a controller stores meta data together with timestamps according to exemplary embodiments of the inventive concept. For example, the controller 110 may generate a timestamp, and may transmit meta data and the timestamp together to the nonvolatile memory 130. The nonvolatile memory 130 may store the meta data and the timestamp at a location requested by the controller 110.

An example is illustrated in FIGS. 3 to 6 where two segments are stored per physical page of the nonvolatile memory 130, but the inventive concept is not limited thereto. An example is illustrated in FIGS. 7 and 8 where two or more segments are stored per physical page of the nonvolatile memory 130. The number of physical pages and the number of blocks allocated to the main meta data areas MMA1 and MMA2 and the journal areas JA1 and JA2 are not limited to the example illustrated in FIGS. 7 and 8.

Referring to FIG. 7, the controller 110 may transmit a plurality of segments (e.g., SG111 to SG11$y$: $y$ being a natural number) and one timestamp (e.g., TS11) to the nonvolatile memory 130. In this case, the total size of the plurality of segments SG111 to SG11$y$ and the one timestamp TS11 may correspond to a size of one physical page of the nonvolatile memory 130. The timestamp TS11 that is transmitted together with the plurality of segments SG111 to SG11$y$ may indicate a time when the segments SG111 to SG11$y$ are transmitted to the nonvolatile memory 130, or are stored in the nonvolatile memory 130. For example, values of timestamps TS11 to TS1$x$ stored at physical pages of the main meta data area MMA1 may be different from values of timestamps TS21 to TS2$x$ stored at physical pages of the main meta data area MMA2. Similar to the above manner in which the segments SG111 to SG11$y$ and the timestamp TS11 are stored, the remaining segments SG121 to SG1$xy$ and SG211 to SG2$xy$ and the remaining timestamps TS12 to TS1$x$ and TS21 to TS2$x$ may be stored in the main meta data areas MMA1 and MMA2.

The controller 110 may transmit journal entries (e.g., JE111 to JE11$n$: $n$ being a natural number) stored in the journal buffer JB and one timestamp TS31 to the nonvolatile memory 130. In this case, the total size of the journal entries JE111 to JE11$n$ and the one timestamp TS31 may correspond to a size of one physical page of the nonvolatile memory 130. The journal entries JE111 to JE11$n$ may be journal data. The timestamp TS31 that is transmitted together with the plurality of journal entries JE111 to JE11$n$ may indicate a time when the journal entries JE111 to JE11$n$ are transmitted to the nonvolatile memory 130 or are stored in the nonvolatile memory 130. For example, values of journal entries TS31 to TS3$m$ stored at physical pages of the journal area JA1 may be different from values of journal entries TS41 to TS4$m$ stored at physical pages of the journal area JA2. Additionally, values of the timestamps TS31 to TS3$m$ and TS41 to TS4$m$ stored in the journal areas JA1 and JA2 may be different from values of the timestamps TS11 to TS1$x$ and TS21 to TS2$x$ stored in the main meta data areas MMA1 and MMA2. Similar to the above manner in which the journal entries JE111 to JE11$n$ and the timestamp TS31 are stored, the remaining journal entries JE1$m$1 to JE1$mn$ and JE211 to JE2mn and the remaining timestamps TS3m and TS41 to TS4m may be stored in the journal areas JA1 and JA2.

Referring to FIG. 8, the controller 110 may transmit one timestamp (e.g., TS111) to the nonvolatile memory 130 for each segment (e.g., SG111). In this case, the total size of the plurality of segments (e.g., SG111 to SG11y) and the plurality of timestamps TS111 to TS11y may correspond to a size of one physical page of the nonvolatile memory 130. The timestamps TS111 to TS1xy and TS211 to TS2xy of FIG. 8 may indicate times when the segments SG111 to SG1xy and SG211 to SG2xy are transmitted to the nonvolatile memory 130 or are stored in the nonvolatile memory 130. For example, values of timestamps TS111 to TS1xy stored in the main meta data area MMA1 may be different from values of timestamps TS211 to TS2xy stored in the main meta data area MMA2.

In an exemplary embodiment of the inventive concept, in the case of recovering the address mapping table AMT, the FTL may identify timestamps TS11 to TS1x, TS21 to TS2x, TS31 to TS3m, and TS41 to TS4m (in the case of FIG. 7) or TS111 to TS1xy, TS211 to TS2xy, TS31 to TS3m, and TS41 to TS4m (in the case of FIG. 8) stored in the main meta data areas MMA1 and MMA2 and the journal areas JA1 and JA2. Based on the timestamps TS, the FTL may identify one, in which the latest address mapping table AMT is stored, from the main meta data areas MMA1 and MMA2, and may identify one, in which journal data of the latest address mapping table AMT are stored, from among the journal areas JA1 and JA2. Additionally, the FTL may nullify journal data stored in the journal area JA1 of FIG. 6 based on the timestamps TS of the journal area JA1 and the main meta data area MMA2 of FIG. 6. The FTL may recover the address mapping table AMT on the working memory 112 or the buffer memory 120 based on the latest address mapping table AMT and the latest journal data.

Figure 9:
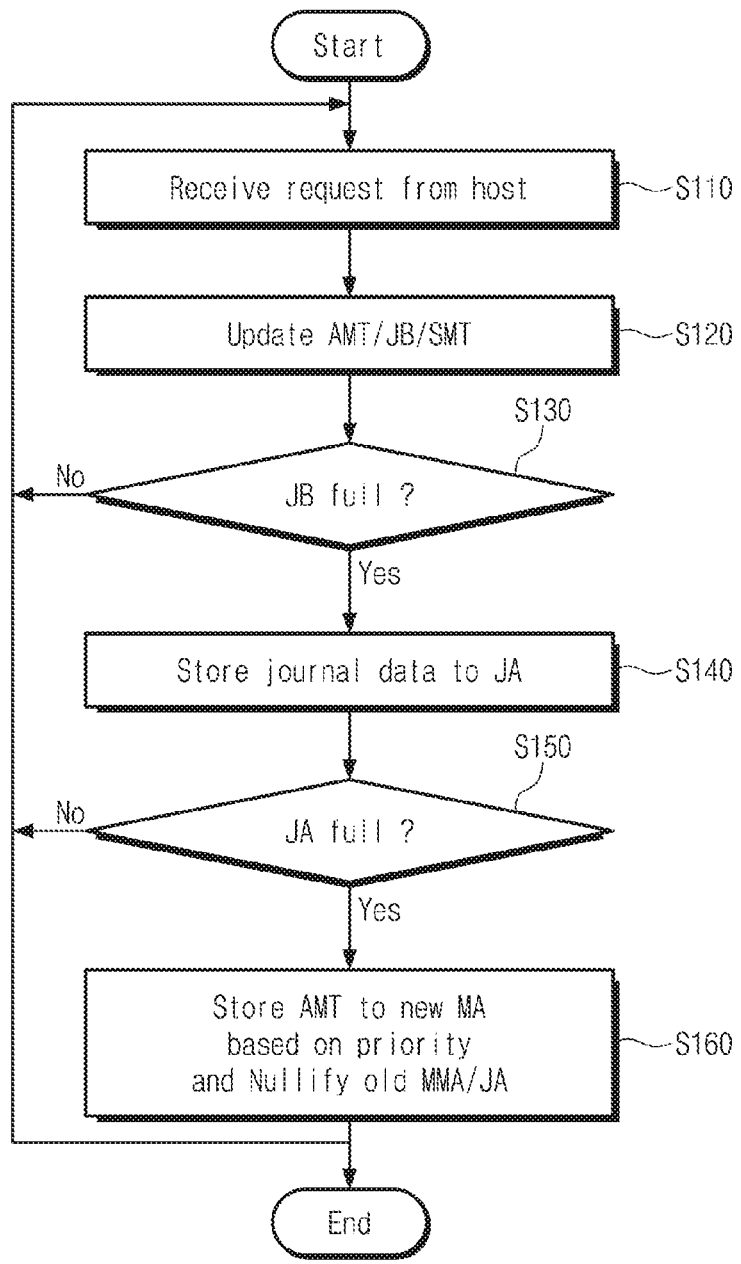
FIG. 9 illustrates a flowchart including processes where a controller according to an exemplary embodiment of the inventive concept stores an address mapping table in a nonvolatile memory.

FIG. 9 illustrates a flowchart including processes where a controller according to an exemplary embodiment of the inventive concept stores an address mapping table in a nonvolatile memory. FIG. 9 will be described with reference to FIGS. 1 to 8.

In operation S110, the controller 110 may receive a request from the host 11. The request of the host 11 may include a logical address. In operation S120, the controller 110 may update the address mapping table AMT, the journal buffer JB, and the segment mapping table SMT depending on the request of the host 11. In operation S120, the controller 110 may update the page mapping entries U1, U2, and U3 of the address mapping table AMT as illustrated in FIGS. 3 to 6. The controller 110 may store or overwrite the updated page mapping entries U1, U2, and U3 in the journal buffer JB as illustrated in FIGS. 3 to 6. The controller 110 may update the update times UT of the page mapping entries U1, U2, and U3 of the segments SG in the segment mapping table SMT and the numbers of page mapping entries U1, U2, and U3 of the respective segments SG in the segment mapping table SMT as illustrated in FIGS. 3 to 6.

In operation S130, the controller 110 may identify whether the journal buffer JB is full. When the journal buffer JB is full (Yes), the controller 110 may perform operation S140; when the journal buffer JB is not full (No), the controller 110 may repeatedly perform operation S110 to operation S130.

In operation S140, the controller 110 may store or overwrite journal data stored in the journal buffer JB in a journal area (one of JA1 and JA2) of the nonvolatile memory 130. As described with reference to FIGS. 7 and 8, the controller 110 may transmit the journal data stored in the journal buffer JB together with a timestamp to the nonvolatile memory 130. The journal data stored in the journal buffer JB and the timestamp may be stored in a journal area (one of JA1 and JA2) together.

In operation S150, the controller 110 may identify whether a journal area (one of JA1 and JA2) is full. When the journal area (one of JA1 and JA2) is full (Yes), the controller 110 may perform operation S160; when the journal area (one of JA1 and JA2) is not full (No), the controller 110 may repeatedly perform operation S110 to operation S150.

In operation S160, the controller 110 may write or store the segments SG of the address mapping table AMT in a new main meta data area (MMA2 in the case of FIG. 6) based on priorities. The controller 110 may nullify a previous address mapping table AMT stored in another main meta data area (MMA1 in the case of FIG. 6) and journal data stored in a journal area (JA1 in the case of FIG. 6) while storing the segments SG in the new main meta data area based on priorities.

Figure 10:
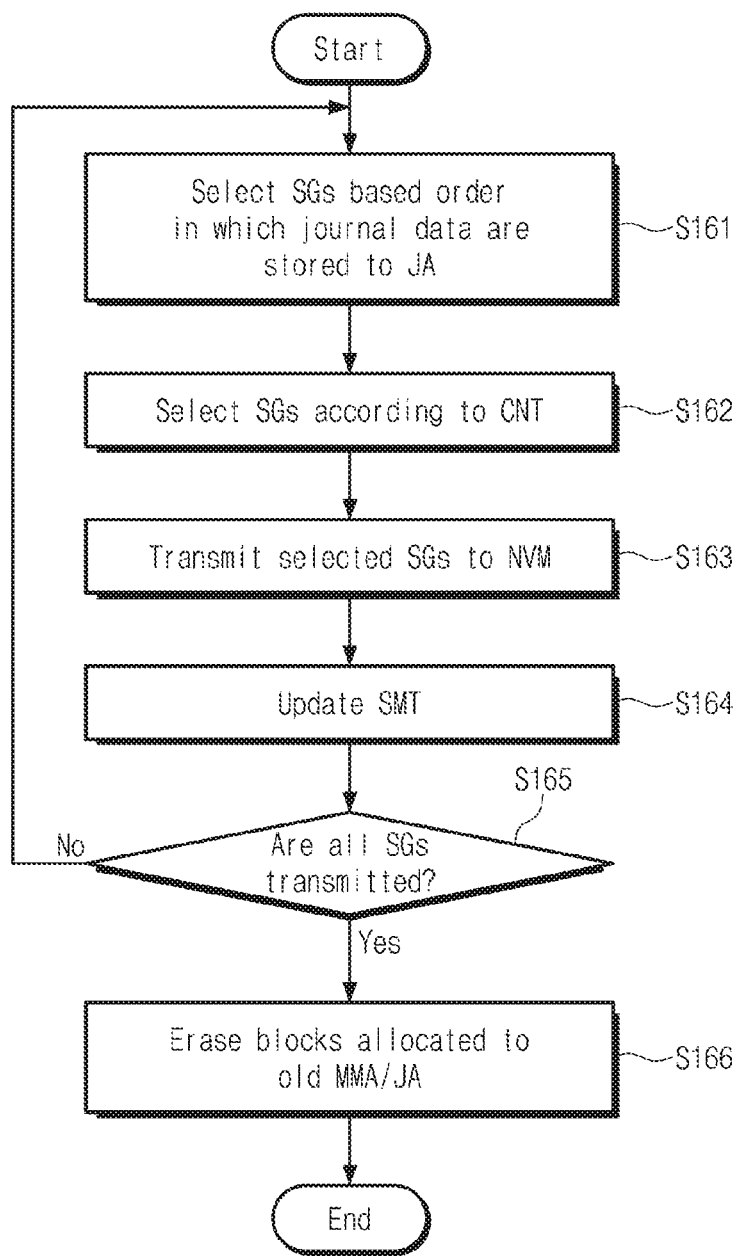
FIG. 10 illustrates a flowchart including detailed operations constituting operation S160 of FIG. 9 according to an exemplary embodiment of the inventive concept.

FIG. 10 illustrates a flowchart including detailed operations constituting operation S160 of FIG. 9 according to an exemplary embodiment of the inventive concept. In operation S161, the controller 110 may select the segments SG in the order in which journal data are stored in a journal area (JA1 in the case of FIG. 6). In the case of FIG. 6, the controller 110 may select the segments SG3 and SG7 corresponding to journal data first stored in the journal area JA1.

In operation S162, the controller 110 may select the segments SG depending on the count CNT of the segment mapping table SMT. As described above, the count CNT of the segment mapping table SMT may indicate the number of updated page mapping entries of each of the segments SG. In the case of FIG. 6, the controller 110 may select the segments SG3 and SG7. As another example, in the case where the number of segments selected in operation S161 is more than in the case of FIG. 6, the segments SG may be selected depending on the count CNT of the segment mapping table SMT.

In operation S163, the controller 110 may transmit the segments selected in operation S161 and S162 to a main meta data area (MMA2 in the case of FIG. 6) of the nonvolatile memory 130. In operation S164, the controller 110 may update the segment mapping table SMT such that the segment mapping table SMT has a location of the nonvolatile memory 130, at which the segments transmitted in operation S163 are stored. In operation S165, the controller 110 may identify whether all the segments SG of the address mapping table AMT are transmitted to the nonvolatile memory 130. When a part of the segments SG is not transmitted to the nonvolatile memory 130 (No), the controller 110 may repeatedly perform operation S161 to operation S165; when all the segments SG are transmitted to the nonvolatile memory 130 (Yes), the controller 110 may perform operation S166.

In operation S166, the controller 110 may erase blocks of the nonvolatile memory 130 allocated to a previous main meta data area (MMA1 in the case of FIG. 6), or the address mapping table AMT and journal data stored in the blocks. In an exemplary embodiment of the inventive concept, the controller 110 may identify timestamps stored in respective main meta data areas and timestamps stored in respective journal areas, may identify a main meta data area and a journal area that are not the latest (e.g., correspond to a previous version), and may erase data stored in the identified areas.

In an exemplary embodiment of the inventive concept, the controller 110 may process the request of the host 11 received in operation S110 while performing operation S120 to operation S160 and operation S161 to operation S166. Operation S110 to operation S160 and operation S161 to operation S166 illustrated in the flowcharts of FIGS. 9 and 10 may be performed at the same time or may be performed at different times.

Figure 11:
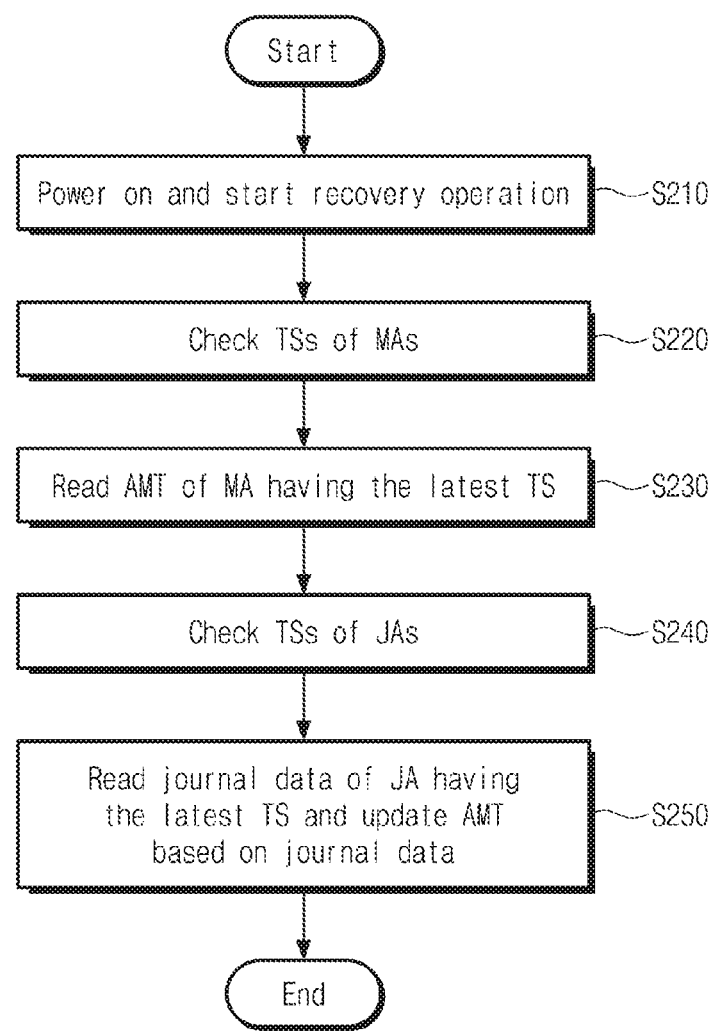
FIG. 11 illustrates a flowchart including a process where a controller according to an exemplary embodiment of the inventive concept recovers an address mapping table.

FIG. 11 illustrates a flowchart including a process where a controller according to an exemplary embodiment of the inventive concept recovers an address mapping table. In operation S210, the storage device 100 may be powered on or a power supply voltage may be supplied to the storage device 100, and the controller 110 may start a recovery operation. The recovery operation may refer to the following process after a power event: meta data are read from the nonvolatile memory 130, and the meta data are again loaded on the working memory 112 or the buffer memory 120. The recovery operation requires the journal replay of reading journal data stored in a journal area and updating meta data again loaded based on the journal data, e.g., the address mapping table AMT.

In operation S220, the controller 110 may identify timestamps stored in main meta data areas. The controller 110 may compare the timestamps to identify the latest date main meta data area. In operation S230, the controller 110 may read the address mapping table AMT stored in a main meta data area having the latest timestamp. In the case where a power event occurs while segments of the address mapping table AMT are stored in the main meta data area MMA2 (at a time between the write time W1 and the write time W4 of FIG. 6), all the segments may not be stored normally in the main meta data area MMA2. In this case, the controller 110 may read segments stored in the main meta data area MMA2 having the latest timestamp and the main meta data area MMA1 having a timestamp immediately before the latest timestamp, and may load the address mapping table AMT obtained by combining the read segments onto the working memory 112 or the buffer memory 120.

In operation S240, the controller 110 may identify timestamps stored in journal areas. The controller 110 may compare the timestamps to identify the latest journal area. Additionally, the controller 110 may identify whether journal data stored in each of the journal areas are nullified by comparing the timestamps of operation S220 and the timestamps of operation S240. For example, the controller 110 may identify that journal data of the physical page PPN5 of the journal area JA1 of FIG. 6 are nullified after the write time W1, by comparing a timestamp, stored together with the journal data of the physical page PPN5 of the journal area JA1 of FIG. 6, with a timestamp, stored together with segments of the physical page PPN1 of the main meta data area MMA2 of FIG. 6. As in the above manner, the controller 110 may identify that journal data of the physical page PPN6 of the journal area JA1 of FIG. 6 are nullified after the write time W2.

In operation S250, the controller 110 may read journal data of a journal area having the latest timestamp and may update the address mapping table AMT loaded on the working memory 112 or the buffer memory 120 based on the read journal data, and the controller 110 may perform the journal replay.

Several example scenarios will be described below according to exemplary embodiments of the inventive concept.

The following condition is assumed: 1) a power event occurs after journal data are stored at the physical page PPN5 of the journal area JA2 after the write time W4 of FIG. 6, 2) the address mapping table AMT loaded on the working memory 112 or the buffer memory 120 are lost due to the power event, and 3) the storage device 100 is again powered on or a power supply voltage is supplied to the storage device 100. The controller 110 may compare timestamps stored in the respective main meta data areas MMA1 and MMA2, may read the segments SG1 to SG8 of the address mapping table AMT from the latest main meta data area MMA2, and may load the address mapping table AMT onto the working memory 112 or the buffer memory 120. The controller 110 may compare timestamps stored in the respective journal areas JA1 and JA2, may read journal data from the latest journal area JA2, and may update the address mapping table AMT loaded onto the working memory 112 or the buffer memory 120 based on the journal data.

The following condition is assumed: 1) a power event occurs after the write time W2 and before the write time W3 of FIG. 6, 2) the address mapping table AMT loaded on the working memory 112 or the buffer memory 120 is lost due to the power event, and 3) the storage device 100 is again powered on or a power supply voltage is supplied to the storage device 100. Because the whole of the latest address mapping table AMT is not stored in the main meta data area MMA2, the controller 110 may recover the address mapping table AMT on the working memory 112 or the buffer memory 120 based on the address mapping table AMT stored in the main meta data areas MMA1 and MMA2. The controller 110 may compare timestamps stored in the respective main meta data areas MMA1 and MMA2, may read the segments SG3, SG7, SG1, and SG5 of the address mapping table AMT from the latest main meta data area MMA2, may read the segments SG2, SG4, SG6, and SG8 of the address mapping table AMT from the previous main meta data area MMA1, and may load the address mapping table AMT including the segments SG3, SG7, SG1, and SG5 of the main meta data area MMA2 and the segments SG2, SG4, SG6, and SG8 of the main meta data area MMA1, onto the working memory 112 or the buffer memory 120. The controller 110 may compare timestamps stored in the journal area JA1 and timestamps stored in the main meta data area MMA2 and may identify that all the journal data stored in the journal area JA1 are nullified. The controller 110 may not perform the journal replay and may recover the address mapping table AMT on the working memory 112 or the buffer memory 120.

The following condition is assumed: 1) a power event occurs after the write time W1 and before the write time W2 of FIG. 6, 2) the address mapping table AMT loaded on the working memory 112 or the buffer memory 120 is lost due to the power event, and 3) the storage device 100 is again powered on or a power supply voltage is supplied to the storage device 100. The controller 110 may compare timestamps stored in the respective main meta data areas MMA1 and MMA2, may read the segments SG3 and SG7 of the address mapping table AMT from the latest main meta data area MMA2, may read the segments SG1, SG5, SG2, SG4, SG6, and SG8 of the address mapping table AMT from the previous main meta data area MMA1, and may load the address mapping table AMT including the segments SG3 and SG7 of the main meta data area MMA2 and the segments SG1, SG5, SG2, SG4, SG6, and SG8 of the main meta data area MMA1, onto the working memory 112 or the buffer memory 120. By comparing timestamps stored in the journal area JA1 and timestamps stored in the main meta data area MMA2, the controller 110 may identify that journal data stored at the physical page PPN5 of the journal area JA1 are nullified and may identify that the journal data stored at the physical page PPN6 of the journal area JA1 are valid. In this case, the controller 110 does not need to perform the journal replay of reading journal data stored at the physical page PPN5 of the journal area JA1 and applying the journal data to the address mapping table AMT. In contrast, the controller 110 may perform the journal replay of reading journal data stored at the physical page PPN6 of the journal area JA1 and applying the journal data to the address mapping table AMT.

Figure 12:
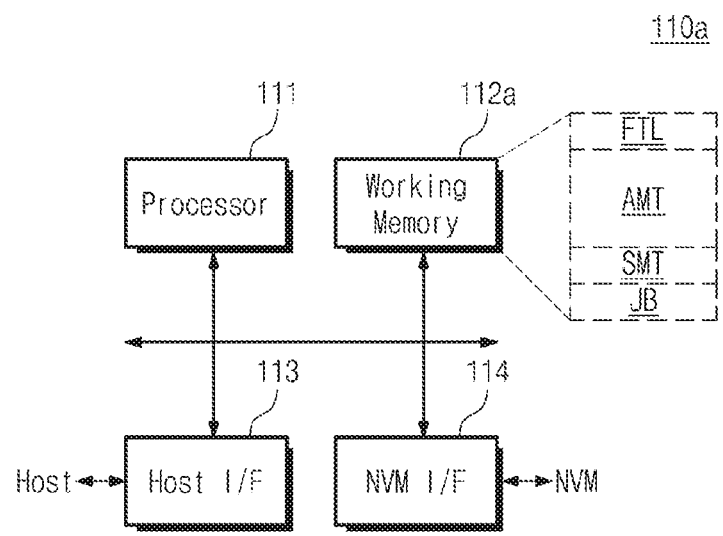
FIG. 12 illustrates a block diagram of a controller of FIG. 1 in detail according to an exemplary embodiment of the inventive concept.

FIG. 12 illustrates a block diagram of a controller of FIG. 1 in detail according to an exemplary embodiment of the inventive concept. The controller 110a may include a processor 111, the working memory 112a, a host interface circuit 113, and a nonvolatile memory interface circuit 114. The working memory 112a is described with reference to FIG. 1. For example, the controller 110a may be implemented by using a system on chip (SoC), an application specific integrated circuit (ASIC), or a field programmable gate array (FPGA).

The processor 111 may control the working memory 112a, the host interface circuit 113, and the nonvolatile memory interface circuit 114. The processor 111 may include one or more cores (e.g., a homogeneous multi-core or a heterogeneous multi-core). For example, the processor 111 may include at least one of a central processing unit (CPU), an image signal processing unit (ISP), a digital signal processing unit (DSP), a graphics processing unit (GPU), a vision processing unit (VPU), or a neural processing unit (NPU). The processor 111 may execute the FTL loaded onto the working memory 112a and may perform operation S110 to operation S160, operation S161 to operation S166, and operation S210 to operation S250 of the flowcharts of FIGS. 9 to 11.

The host interface circuit 113 may communicate with the host 11 in compliance with an interface protocol. For example, the interface protocol may be universal serial bus (USB), small computer system interface (SCSI), peripheral component interconnect express (PCIe), mobile PCIe (M-PCIe), nonvolatile memory express (NVMe), advanced technology attachment (ATA), parallel ATA (PATA), serial ATA (SATA), serial attached SCSI (SAS), integrated drive electronics (IDE), universal flash storage (UFS), FireWire, etc.

The nonvolatile memory interface circuit 114 may communicate with the nonvolatile memory 130 in compliance with an interface protocol such as toggle double data rate (DDR). The nonvolatile memory interface circuit 114 may transmit segments of the address mapping table AMT to the nonvolatile memory 130 based on priorities and under control of the processor 111 executing the FTL. The nonvolatile memory interface circuit 114 may transmit the segment mapping table SMT to the nonvolatile memory 130 under control of the processor 111. The nonvolatile memory interface circuit 114 may transmit journal data stored in the journal buffer JB to the nonvolatile memory 130 under control of the processor 111.

Figure 13:
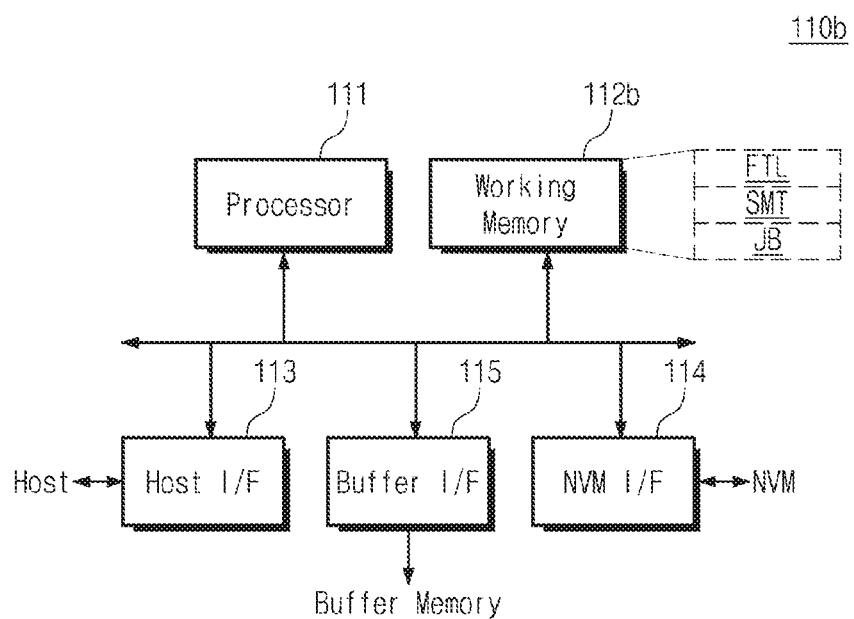
FIG. 13 illustrates a block diagram of a controller of FIG. 2 in detail according to an exemplary embodiment of the inventive concept.

FIG. 13 illustrates a block diagram of a controller of FIG. 2 in detail according to an exemplary embodiment of the inventive concept. The controller 110b may include the processor 111, the working memory 112b, the host interface circuit 113, the nonvolatile memory interface circuit 114, and a buffer memory interface circuit 115. The processor 111, the host interface circuit 113, and the nonvolatile memory interface circuit 114 are described with reference to FIG. 12. The working memory 112b is described with reference to FIG. 2. The buffer memory interface circuit 115 may communicate with the buffer memory 120 in compliance with an interface protocol such as a DDR standard. The buffer memory interface circuit 115 may load and update the address mapping table AMT onto the buffer memory 120 under control of the processor 111. Additionally, the buffer memory interface circuit 115 may provide segments of the address mapping table AMT loaded onto the buffer memory 120 to the nonvolatile memory interface circuit 114 under control of the processor 111.

Figure 14:
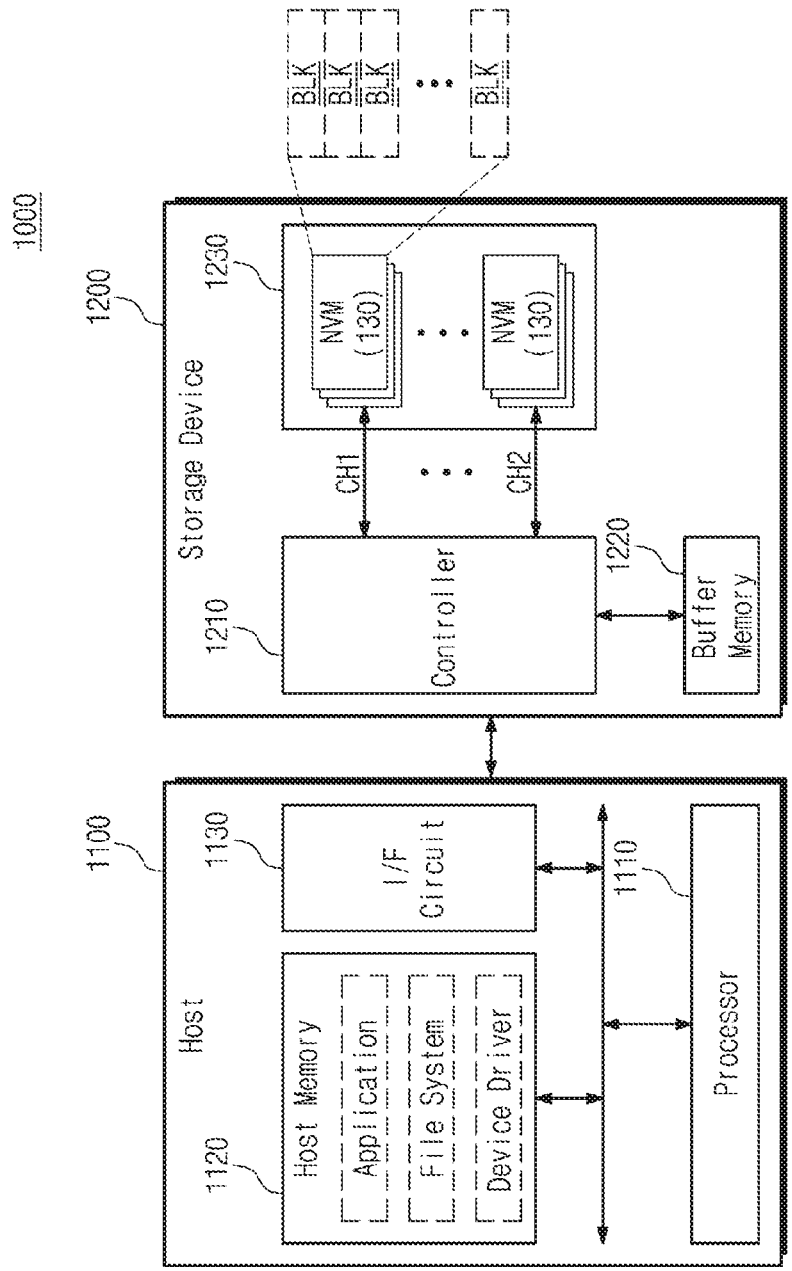
FIG. 14 illustrates a block diagram of an electronic device according to an exemplary embodiment of the inventive concept.

FIG. 14 illustrates a block diagram of an electronic device according to an exemplary embodiment of the inventive concept. An electronic device 1000 may include a host 1100 and a storage device 1200. The host 1100 may include a processor 1110, a host memory 1120, and an interface circuit 1130. The processor 1110 may execute software loaded onto the host memory 1120. The processor 1110 may include a homogeneous multi-core or a heterogeneous multi-core. For example, the processor 1110 may include at least one of a central processing unit (CPU), an image signal processing unit (ISP), a digital signal processing unit (DSP), a graphics processing unit (GPU), a vision processing unit (VPU), or a neural processing unit (NPU).

An operating system OS that manages all hardware and software in the electronic device 1000 may be loaded onto the host memory 1120. An application program included in a user space, a file system included in a kernel space, and a device driver may be loaded onto the host memory 1120. A program and a software layer loaded onto the host memory 1120 are not limited to the example illustrated in FIG. 14. The software layers loaded onto the host memory 1120 may be included in a software stack for accessing the storage device 1200.

The host memory 1120 may include a storage medium such as registers, an on-chip memory, an SRAM device, a TCM device, or a DRAM device. The application program may be executed as a basic (or default) service, or may be executed by a request of the user. The user space where the application program is stored and the kernel space where a kernel including the file system, the device driver, etc. is stored may be separated from each other. The application program does not directly access a resource such as the storage device 1200. Instead, the application program may call a function defined in a library in which a system call function is included, and may request a necessary task from the kernel. In the case where the system call function is called, a switch from a user mode to a kernel mode may occur.

The file system may manage files or data stored in the storage device 1200. For example, the file system may include a file allocation table (FAT), a new technology file system (NTFS), a hierarchical file system (HFS), a high performance file system (HPFS), a Unix file system (UFS), a secondary extended file system (EXT2), EXT3, EXT4, a journaling file system (JFS), JSF2, ISO 9660, Files-11, a veritas file system (VxFS), ZFS, ReiserFS, Reiser4, a universal disk format (UDF), Gnome VFS, BFS, WinFS, etc.

The device driver is a program that operates as a portion of the kernel for controlling a hardware device such as the storage device 1200. The device driver may generate a command or a request for controlling the storage device 1200 under control of the file system. The device driver may perform a role of converting information managed by the file system into information identifiable by the storage device 1200.

The interface circuit 1130 may provide physical connections between the host 1100 and the storage device 1200. For example, the interface circuit 1130 may convert commands, addresses, and data, which correspond to various 10 requests generated from the host 1100, in compliance with a way to communicate with the storage device 1200.

The storage device 1200 may process a request of the host 1100. The storage device 1200 may include a controller 1210, a buffer memory 1220, and a nonvolatile memory device 1230. The controller 1210 may be one of the controllers 110, 110a, and 110b described with reference to FIGS. 1 to 13. The buffer memory 1220 may be the buffer memory 120 described with reference to FIGS. 2 to 13. The nonvolatile memory device 1230 may include at least one of the nonvolatile memories 130 described with reference to FIGS. 1 to 13. The nonvolatile memory device 1230 may include one or more nonvolatile memories 130 communicating with the controller 1210 through a channel CH1 and one or more nonvolatile memories 130 communicating with the controller 1210 through a channel CH2. The number of channels between the nonvolatile memory device 1230 and the controller 1210 is not limited to the example illustrated in FIG. 14.

In an exemplary embodiment of the inventive concept, the nonvolatile memory 130 may include a three-dimensional memory array having a three-dimensional array structure. The three-dimensional memory array may be monolithically formed in one or more physical level(s) of a memory cell array having an active area arranged on a circuit related to an operation of memory cells. The circuit related to an operation of memory cells may be located in a silicon substrate or on the silicon substrate. The term "monolithic" means that layers of each level of the array are directly deposited on layers of an underlying level of the array.

The three-dimensional memory array includes vertical NAND strings that are vertically oriented such that at least one memory cell is located over another memory cell. The at least one memory cell includes a charge trap layer. Each vertical NAND string may include at least one selection transistor located over memory cells. The at least one selection transistor may have substantially the same structure as those of the memory cells and may be monolithically formed together with the memory cells. The three-dimensional memory array may include a plurality of blocks BLK, and the memory cells of the three-dimensional memory array may be divided into the plurality of blocks BLK. The plurality of blocks BLK may be allocated to the user data area USER DATA, the over-provisioning area OP, the main meta data areas MMA1 and MMA2, the journal areas JA1 and JA2, and the segment mapping table area SMTA, which are described above. The following patent documents, which are hereby incorporated by reference in their entireties, describe suitable configurations for the three-dimensional memory structure: U.S. Pat. Nos. 7,679,133, 8,553,466, 8,654,587, and 8,559,235, and U.S. Pat. Pub. No. 2011/0233648.

Figure 15:
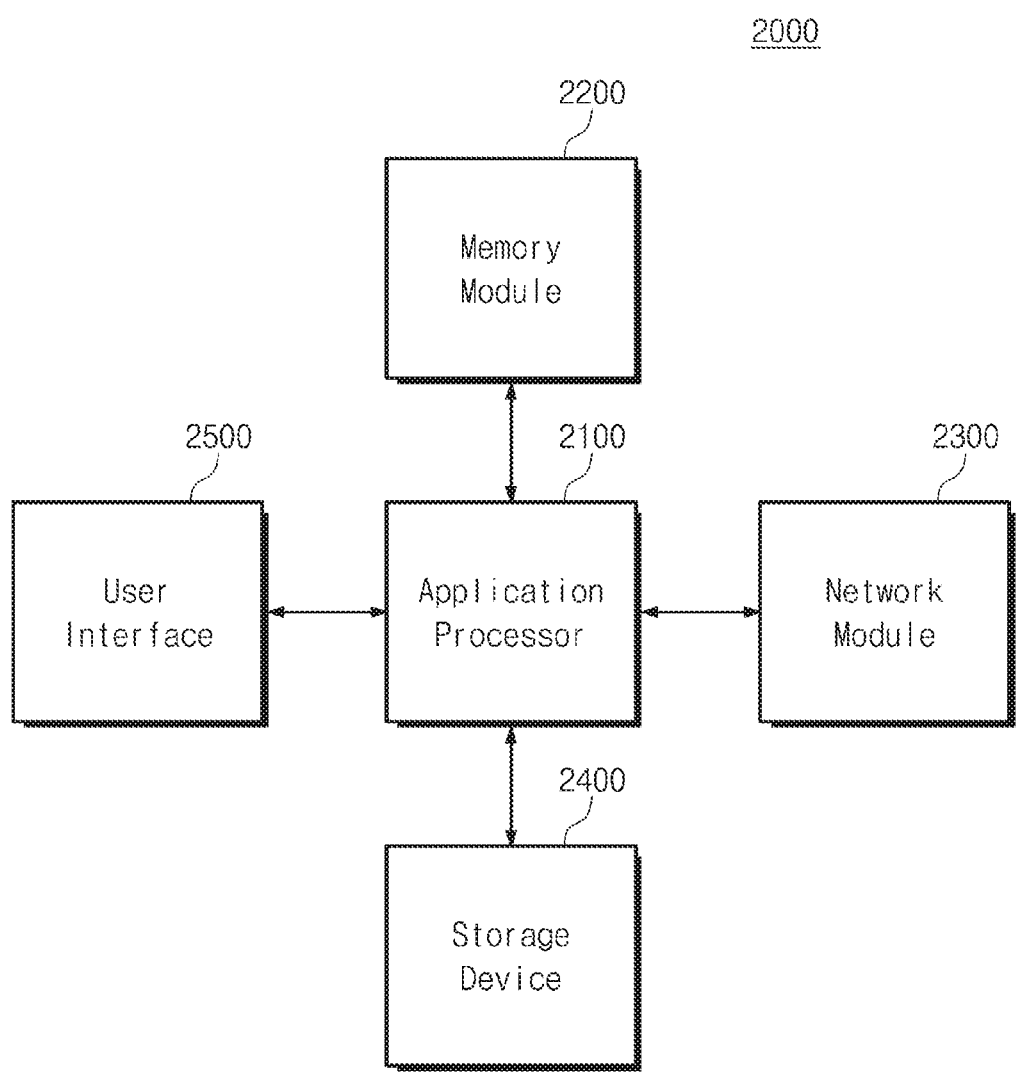
FIG. 15 is a block diagram illustrating a computing system including a storage device according to an exemplary embodiment of the inventive concept.

FIG. 15 illustrates a block diagram of a computing system including a storage device according to an exemplary embodiment of the inventive concept. A computing system 2000 may include an application processor 2100, a memory module 2200, a network module 2300, a storage device 2400, and a user interface 2500. The application processor 2100 may drive components included in the computing system 2000 that is a SoC, and an operating system (OS). For example, the application processor 2100 may include one of the hosts 11 and 1100 described with reference to FIGS. 1 to 14. The memory module 2200 may operate as a main memory, a working memory, a buffer memory, or a cache memory of the computing system 2000. The memory module 2200 may include a volatile random access memory or a nonvolatile random access memory. The network module 2300 may communicate with external devices in a wired/wireless communication manner. The storage device 2400 may be one of the storage devices 100a, 100b, and 1200 described with reference to FIGS. 1 to 14. The user interface 2500 may include interfaces which input data or a command to the application processor 2100, or output data to an external device.

As described above, a controller according to exemplary embodiments of the inventive concept may reduce costs for a journal replay by storing segments of an address mapping table depending on priorities.

While the inventive concept has been described with reference to exemplary embodiments thereof, it will be apparent to those of ordinary skill in the art that various changes and modifications in form and details may be made thereto without departing from the spirit and scope of the inventive concept as set forth in the following claims.

What is claimed is:

1. A storage device comprising:
 a nonvolatile memory including a main meta data area and a journal area; and
 a controller,
 wherein the controller is configured to:
 update an address mapping table including a plurality of page mapping entries divided into a plurality of segments by executing a flash translation layer (FTL) stored in a working memory;
 store updated page mapping entries of the plurality of page mapping entries in the journal area as journal data; and
 store the plurality of segments, each having a size smaller than a physical page of the nonvolatile memory, in the main meta data area,
 wherein the plurality of segments are stored in the main meta data area based on an order in which the plurality of segments are updated, and the number of the updated page mapping entries of each of the plurality of segments.

2. The storage device of claim 1, wherein the controller is further configured to:
 determine a priority in which the plurality of segments are stored in the main meta data area, based on the order and the number of the updated page mapping entries of each of the plurality of segments.

3. The storage device of claim 1, wherein the controller is further configured to:
 update a segment mapping table indicating a location of the main meta data area, at which the plurality of segments are stored, the order, and the number of the updated page mapping entries of each of the plurality of segments.

4. The storage device of claim 3, wherein the controller is further configured to:
 store the segment mapping table in a segment mapping table area of the nonvolatile memory.

5. The storage device of claim 3, further comprising:
 a buffer memory,
 wherein the controller is further configured to:
 load the FTL and the segment mapping table onto the working memory; and
 load the address mapping table onto the working memory or the buffer memory.

6. The storage device of claim 1, wherein the controller is further configured to:
 store a first timestamp in the journal area together with the journal data;

store at least one second timestamp in the main meta data area together with the plurality of segments; and nullify the journal data stored in the journal area based on the first timestamp and the at least one second timestamp.

7. The storage device of claim 1, wherein the updated page mapping entries are first updated page mapping entries, the journal data are first journal data, the journal area is a first journal area, and the main meta data area is a first main meta data area, and wherein the controller is further configured to:

further update the address mapping table;

store second updated page mapping entries of the plurality of page mapping entries in a journal area of the nonvolatile memory different from the first journal area; and store the plurality of segments in a main meta data area of the nonvolatile memory different from the first main meta data area.

8. The storage device of claim 1, wherein the controller is further configured to adjust the size of each of the plurality of segments.

9. An operating method of a storage device which includes a controller configured to execute a flash translation layer (FTL) and a nonvolatile memory including a main meta data area and a journal area, the operating method comprising:

updating, by the controller, an address mapping table including a plurality of page mapping entries;

storing updated page mapping entries of the plurality of page mapping entries in the journal area as journal data; and storing a plurality of segments in the main meta data area based on an order in which the updated page mapping entries are stored in the journal area and the number of the updated page mapping entries of each of the plurality of segments dividing the plurality of page mapping entries, wherein the controller starts the storing of the plurality of segments in the main meta data area when the journal area is full.

10. The operating method of claim 9, further comprising:

erasing at least one block of the nonvolatile memory allocated to the journal area after the storing of the plurality of segments in the main meta data is completed.

11. The operating method of claim 9, wherein the storing the updated page mapping entries as the journal data in the journal area includes storing a first timestamp in the journal area together with the journal data, and wherein the storing of the plurality of segments in the main meta data area includes storing at least one second timestamp in the main meta data area together with the plurality of segments.

12. The operating method of claim 11, further comprising:

identifying the at least one second timestamp after a power event occurs; and reading the plurality of segments from the main meta data area to load the address mapping table.

13. The operating method of claim 12, further comprising:

reading journal data from a journal area of the nonvolatile memory, different from the journal area, to update the address mapping table, when the power event occurs after the storing of the plurality of segments in the main meta data area is completed.

14. The operating method of claim 12, further comprising:

reading the journal data from the journal area to update the address mapping table, when the power event occurs before the storing of the plurality of segments in the main meta data area is completed.

15. An electronic device comprising:

a host configured to transmit a request including a logical address; and a storage device including a nonvolatile memory and a controller, wherein the nonvolatile memory includes a main meta data area and a journal area, wherein the controller is further configured to:

update an address mapping table including a plurality of page mapping entries divided into a plurality of segments by processing the request of the host;

store updated page mapping entries of the plurality of page mapping entries in the journal area as journal data; and store the plurality of segments, each having a size smaller than a physical page of the nonvolatile memory, in the main meta data area, wherein the updated page mapping entries are first updated page mapping entries, the journal data are first journal data, the journal area is a first journal area, and the main meta data area is a first main meta data area, and wherein the controller is further configured to:

further update the address mapping table;

store second updated page mapping entries of the plurality of page mapping entries in a journal area of the nonvolatile memory different from the first journal area; and store the plurality of segments in a main meta data area of the nonvolatile memory different from the first main meta data area.

16. The electronic device of claim 15, wherein the nonvolatile memory further includes a user data area where data associated with the request are stored, and wherein each of the plurality of page mapping entries includes a physical address of the user data area corresponding to the logical address.

17. The electronic device of claim 16, wherein the controller includes:

a memory storing a flash translation layer (FTL) configured to manage the address mapping table associated with the logical address and the physical address; and a processor configured to execute the FTL stored in the memory.

* * * * *